(12) United States Patent
Atsatt

(10) Patent No.: US 8,332,835 B2
(45) Date of Patent: *Dec. 11, 2012

(54) METHOD AND SYSTEM FOR AUTOMATED CODE-SOURCE INDEXING IN JAVA VIRTUAL MACHINE ENVIRONMENT

(75) Inventor: Bryan Atsatt, Half Moon Bay, CA (US)

(73) Assignee: Oracle International Corporation, Redwood Shores, CA (US)

( * ) Notice: Subject to any disclaimer, the term of this patent is extended or adjusted under 35 U.S.C. 154(b) by 198 days.

This patent is subject to a terminal disclaimer.

(21) Appl. No.: 12/824,523

(22) Filed: Jun. 28, 2010

(65) Prior Publication Data

US 2011/0023020 A1 Jan. 27, 2011

Related U.S. Application Data

(63) Continuation of application No. 11/224,853, filed on Sep. 12, 2005, now Pat. No. 7,784,043.

(51) Int. Cl.
*G06F 9/44* (2006.01)
(52) U.S. Cl. .................... 717/166; 713/2
(58) Field of Classification Search .............. 717/166
See application file for complete search history.

(56) References Cited

U.S. PATENT DOCUMENTS

| | | | |
|---|---|---|---|
| 5,488,711 A | 1/1996 | Hewitt et al. | |
| 6,081,807 A | 6/2000 | Story et al. | |
| 6,321,323 B1 | 11/2001 | Nugroho et al. | |
| 6,442,565 B1 | 8/2002 | Tyra et al. | |
| 6,718,364 B2 | 4/2004 | Connelly et al. | |
| 6,738,977 B1 | 5/2004 | Berry et al. | |
| 6,748,396 B2 | 6/2004 | Kilcnik | |
| 6,915,511 B2 | 7/2005 | Susarla et al. | |
| 6,973,646 B1 | 12/2005 | Bordawekar et al. | |
| 7,035,870 B2 | 4/2006 | McGuire et al. | |
| 7,039,923 B2 | 5/2006 | Kumar et al. | |
| 7,069,550 B2 | 6/2006 | Fraenkel et al. | |
| 7,316,010 B1 | 1/2008 | Daynes et al. | |
| 7,398,523 B2 | 7/2008 | Martin et al. | |
| 7,516,331 B2 | 4/2009 | Jin et al. | |
| 7,644,403 B2 | 1/2010 | Atsatt | |
| 7,784,043 B2 | 8/2010 | Atsatt | |
| 7,814,472 B2 | 10/2010 | Atsatt | |
| 7,954,096 B2 | 5/2011 | Atsatt | |
| 8,020,156 B2 | 9/2011 | Atsatt et al. | |
| 2003/0121031 A1 | 6/2003 | Fraenkel et al. | |
| 2005/0021487 A1 | 1/2005 | Verma et al. | |
| 2005/0027757 A1 | 2/2005 | Kiessig et al. | |

(Continued)

OTHER PUBLICATIONS

U.S. Appl. No. 11/225,144, filed Sep. 12, 2005, Notice of Allowance mailed May 11, 2011, 7 pages.

(Continued)

*Primary Examiner* — James D Rutten
(74) *Attorney, Agent, or Firm* — Kilpatrick Townsend & Stockton LLP

(57) ABSTRACT

A method and system for class loading in a Java Virtual Machine (JVM) environment. Specifically, the system includes a code-source index and a mapper. The code-source index is associated with at least one class loader in a class loader tree in the JVM environment. The code-source index includes a plurality of parameters for cross-referencing packages in the at least one class loader to code-sources. The system also includes a mapper for referencing the code-source index. That is, the mapper maps a package associated with a class to one or more associated code-sources that potentially can access the class in the class loader tree.

20 Claims, 11 Drawing Sheets

U.S. PATENT DOCUMENTS

| | | |
|---|---|---|
| 2005/0028152 A1 | 2/2005 | Hays et al. |
| 2005/0060698 A1 | 3/2005 | Boykin et al. |
| 2005/0154785 A1 | 7/2005 | Reed et al. |
| 2006/0070051 A1 | 3/2006 | Kuck et al. |
| 2006/0143622 A1 | 6/2006 | Prabandham et al. |
| 2006/0206903 A1 | 9/2006 | Lawrence et al. |
| 2006/0248140 A1 | 11/2006 | Birenheide |
| 2007/0006203 A1 | 1/2007 | Marwinski |
| 2007/0061792 A1 | 3/2007 | Atsatt |
| 2007/0061795 A1 | 3/2007 | Atsatt |
| 2007/0061796 A1 | 3/2007 | Atsatt |
| 2007/0061797 A1 | 3/2007 | Atsatt et al. |
| 2007/0061798 A1 | 3/2007 | Atsatt |
| 2010/0070960 A1 | 3/2010 | Atsatt |

OTHER PUBLICATIONS

U.S. Appl. No. 11/225,143, filed Sep. 12, 2005, Notice of Allowance mailed Jan. 20, 2011, 7 pages.

U.S. Appl. No. 11/225,144, filed Sep. 12, 2005, Office Action mailed Jan. 20, 2011, 11 pages.

"About the OSGI Service Platform," Technical Whitepaper, Revision 3.0, Jun. 12, 2004, OSGI Alliance, pp. 1-17.

"JAR File Specification", Sun Microsystems, retrieved online at http://web.archive.org/web/20000815091814/http://java.sun.com/j2se/1.3/docs/guide/jar/jar.html, 11 pages, published Aug. 15, 2000.

Atsatt, Bryan, et al., "Classloading in Oracle9iAS Containers for J2EE", Jan. 2003, Oracle Corp., retrieved online at http://oracle.com/technology/tech/java/oc4j/pdf/ClassLoadingInOC4J_WP.pdf, an Oracle White Paper, 24 pages.

Hall, Richard S. "A Policy-Driven Class Loader to Supprt Deployment in Extensible Frameworks", May 3, 2004, Springer Berlin / Heidelberg, Lecture Notes in Computer Science: Component Development, vol. 3083/2004, pp. 81-96.

Hovenmeyer, David and Pough, William, "More Efficient Network Class Loading through Building," Proceedings of the 2001 Symposium on Java TM Virtual Machine Research Technology Symposium—vol. 1, 2001, 13 pages.

Krause, Jens and Plattner, Bernhard, "Safe Class Sharing among Java Processes," Research Report, Apr. 24, 2000, http://www.zurich.ibm.com/pdf/rz3230.pdf, pp. 1-14.

OSGI Alliance; "OSGI Service Platform Core Specification," Aug. 2005, pp. 1-276.

U.S. Appl. No. 11/224,853, filed Sep. 12, 2005, Final Office Action mailed Mar. 30, 2010, 13 pages.

U.S. Appl. No. 11/224,853, filed Sep. 12, 2005, Notice of Allowance mailed Jun. 11, 2010, 7 pages.

U.S. Appl. No. 11/224,853, filed Sep. 12, 2005, Office Action mailed Oct. 1, 2009, 16 pages.

U.S. Appl. No. 11/224,893, filed Sep. 12, 2005, Notice of Allowance mailed Aug. 20, 2009, 12 pages.

U.S. Appl. No. 11/225,143, filed Sep. 12, 2005, Advisory Action mailed Apr. 5, 2010, 3 pages.

U.S. Appl. No. 11/225,143, filed Sep. 12, 2005, Final Office Action mailed Jan. 20, 2010, 9 pages.

U.S. Appl. No. 11/225,143, filed Sep. 12, 2005, Office Action mailed Jun. 26, 2009, 13 pages.

U.S. Appl. No. 11/225,144, filed Sep. 12, 2005, Advisory Action mailed Apr. 5, 2010, 3 pages.

U.S. Appl. No. 11/225,144, filed Sep. 12, 2005, Final Office Action mailed Jan. 20, 2010, 13 pages.

U.S. Appl. No. 11/225,144, filed Sep. 12, 2005, Office Action mailed Jun. 19, 2009, 13 pages.

U.S. Appl. No. 11/225,535, filed Sep. 12, 2005, Advisory Action mailed Mar. 12, 2010, 3 pages.

U.S. Appl. No. 11/225,535, filed Sep. 12, 2005, Final Office Action mailed Dec. 28, 2009, 19 pages.

U.S. Appl. No. 11/225,535, filed Sep. 12, 2005, Notice of Allowance mailed Jun. 3, 2010, 9 pages.

U.S. Appl. No. 11/225,535, filed Sep. 12, 2005, Office Action mailed Jun. 23, 2009, 9 pages.

METHOD AND SYSTEM FOR AUTOMATED CODE-SOURCE INDEXING IN JAVA VIRTUAL MACHINE ENVIRONMENT

CROSS-REFERENCES TO RELATED APPLICATIONS

This Application is a continuation application of U.S. patent application Ser. No. 11/224,853 by Bryan Atsatt, filed on Sep. 12, 2005, entitled "Method and System for Automated Code Source Indexing in Java Virtual Machine Environment," which issued as U.S. Pat. No. 7,784,043 on Aug. 24, 2010, the content of which is hereby incorporated herein by reference. This Application is also related to U.S. patent application Ser. No. 11/224,893 by Bryan Atsatt, filed on Sep. 12, 2005, entitled "Method and System for Automated Root-Cause Analysis for Class Loading Failures in Java," which issued as U.S. Pat. No. 7,644,403 on Jan. 5, 2010, assigned to the assignee of the present invention. To the extent not repeated herein, the contents of this related patent application are hereby incorporated herein by reference.

This Application is also related to U.S. patent application Ser. No. 11/225,535 by Bryan Atsatt, filed on Sep. 12, 2005, entitled "System and Method for Shared Code-Sourcing in a Java Virtual Machine Environment," assigned to the assignee of the present invention. To the extent not repeated herein, the contents of this related patent application are hereby incorporated herein by reference.

This Application is also related to U.S. patent application Ser. No. 11/225,143 by Bryan Atsatt, filed on Sep. 12, 2005, entitled "A Shared Loader System and Method," assigned to the assignee of the present invention. To the extent not repeated herein, the contents of this related patent application are hereby incorporated herein by reference.

This Application is also related to U.S. patent application Ser. No. 11/225,144 by Bryan Atsatt, filed on Sep. 12, 2005, entitled "A Bulk Loading System and Method," assigned to the assignee of the present invention. To the extent not repeated herein, the contents of this related patent application are hereby incorporated herein by reference.

BACKGROUND OF THE INVENTION

1. Field of the Invention

Embodiments of the present invention relate to the field of class loading in a Java Virtual Machine environment. More particularly, embodiments of the present invention relate generally to automated code-source indexing in the Java Virtual Machine environment.

2. Related Art

Java programs are composed of name classes e.g., "java.lang.String") and other data is referred to as resource data (e.g., "resource". Classes and resources are loaded into a Java Virtual Machine (JVM) by a class loader. Each class loader contains one or more code-sources (e.g., class or resources archives, such as ".jar" or ".zip" files) from which to obtain class files that are converted into class instances or resource data for application use. Class and resource names are prefixed by a "package" name, such as "java.lang" for the "String" class. Generally, many classes share a package name.

The term "class loading" refers to the process of locating the bytes for a given class name and converting them into a Java class instance. All "java.lang.Class" instances within a JVM start life as an array of bytes structured in the class format defined by the JVM specification.

Class loading is performed by the JVM during the startup process, and subsequently by subclasses of the "java.lang.ClassLoader" class. These "classloaders" provide an abstraction that allows the JVM to load classes without any knowledge of where the class bytes come from. This enables both local and remote storage as well as dynamic class generation. Furthermore, class loaders provide "dynamic-loading" capabilities that provide a great deal of extensibility to the Java language and are the basis for the mobile code capabilities of the Java language. In addition to loading classes, classloaders can be used to load native code (e.g., .dll files).

A classloader is a subclass of the "java.lang.ClassLoader" class that is responsible for loading classes. In a JVM environment class loaders are arranged in a tree hierarchy, where each class loader has a single parent. Each class loader is designed to work with one or more code-sources. For example, each classloader contains one or more code-sources that are class or resource archives (e.g., jars, zip files, etc.) from which to obtain class files to convert into class instances or resource data for application use.

A code-source is a root location from which the classloader searches for classes. Although the name implies the loading of classes only, class loaders can be used to load any file from the configured code-sources using, for example, the "getResource" and "getResourceAsStream" methods. Code-sources can be defined to represent physical storage of binary class files, java sources that must first be compiled, or even classes generated on the fly. For example, a code-source can be a directory, a zip file, a jar file, etc. A classloader uses each code-source, along with a class package name, to define a location to search for classes.

When a class load event occurs, a class loader is selected (e.g., the "initiating" classloader) to search for the class. In a standard search algorithm, the classloader searches up the parent chain in the classloader tree of the JVM environment before searching for the class in the initiating classloader. Each loader visited during the search must consult its list of code-sources to try to find the class. The classloader that locates and converts the class file into a class instance is referred to as the "defining" loader. The first matching class is returned. Once loaded, the class is added to a cache that is used to short-circuit the search process, thus avoiding code-source consultation.

In complex JVM environment that contain multiple class loaders, it is common for an initiating class loader to have many ancestors. Each of the ancestor, class loaders may contain many code-sources. As a result, in a typical class loading event, a significant amount of time is devoted to locating the specific code-source in a class loader, for example. That is, each of the code-sources associated with a specific class loader would be queried non-discriminately, in order, to determine whether it is able to access that class. As a result, the search mechanism would waste time consulting ancestor class loaders that cannot load the class, and waste time consulting code-sources that cannot satisfy the search. As a result, unnecessary time and resources are wasted in conducting a search for a class loading event.

SUMMARY OF THE INVENTION

A method and system for class loading in a Java Virtual Machine (JVM) environment. Specifically, the system includes a code-source index and a mapper. The code-source index is associated with at least one class loader in a class loader tree in the JVM environment. The code-source index includes a plurality of parameters for cross-referencing packages in the at least one class loader to code-sources. The system also includes a mapper for referencing the code-source index. That is, the mapper maps a package associated with a class to one or more associated code-sources that potentially can access the class in the class loader tree.

DETAILED DESCRIPTION OF THE INVENTION

Figure 1:
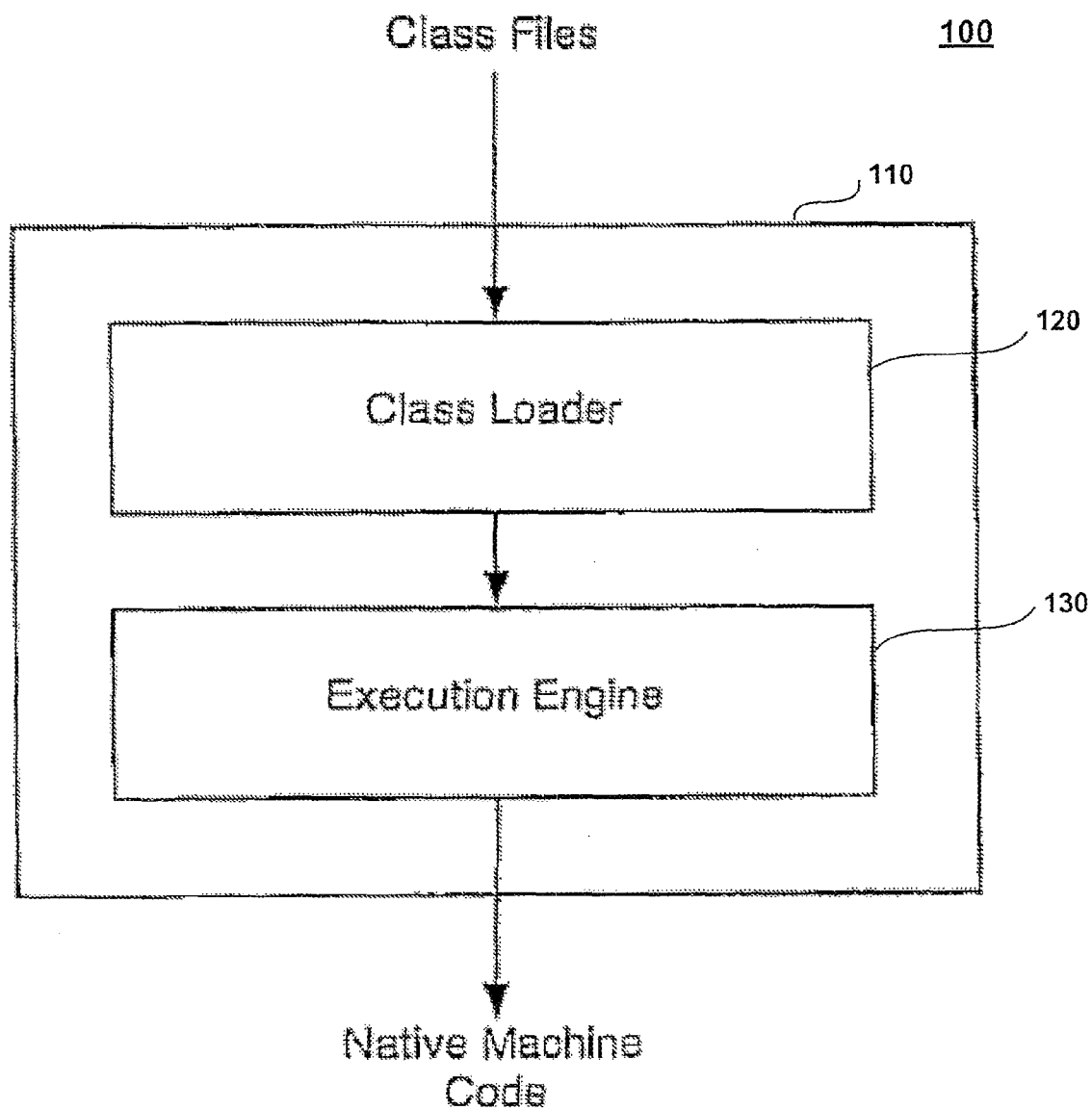
FIG. 1 is a block diagram illustrating a Java Virtual Environment (JVM) in a computing environment, in accordance with one embodiment of the present invention.

Reference will now be made in detail to the preferred embodiments of the present invention, a method and system for automated code-source indexing in a java virtual machine environment, examples of which are illustrated in the accompanying drawings.

Accordingly, various embodiments of the present invention disclose a method and system for automated code-source indexing in a JVM environment that can be implemented for class loading. In particular, embodiments of the present invention provide for a centralized management of code-source in a JVM environment, regardless of the class loader.

Notation and Nomenclature

Embodiments of the present invention can be implemented on software running on a computer system. The computer system can be a personal computer, notebook computer, server computer, mainframe, networked computer, handheld computer, personal digital assistant, workstation, and the like. This software program is operable for providing a Java Virtual Machine (JVM environment. In one embodiment, the computer system includes a processor coupled to a bus and memory storage coupled to the bus. The memory storage can be volatile or non-volatile and can include removable storage media. The computer can also include a display, provision for data input and output, etc.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "identifying," "augmenting," "determining," "discovering," and "accessing," or the like, refer to the actions and processes of a computer system, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Java Virtual Machine Environment

A JVM is an environment from which Java programs are executed. Since the JVM environment can be implemented in software, the JVM can be platform independent. As such, Java programs can be executed on any device supporting a JVM environment. In general, a Java program is expressed as source files that are compiled into Java class files. The Java class files are executed in the JVM.

FIG. 1 is a block diagram illustrating a JVM 110 in a computing environment, in accordance with one embodiment of the present invention. The computing environment can be any computing platform, such as a computer, such as a personal computer, cell phone, television, or any suitable electronic device. The JVM 110 is comprised of a class loader 120 and an execution engine 130.

The class loader 120 loads class files that are accessible by the JVM 110. For instance, the Java program is compiled into class files accessible by the JVM. These class files may be program specific, or associated with the Java application program interface (API). The Java API is composed of a set of runtime libraries of class files that are accessible to any JVM, and are platform independent. As such, the class loader loads the class files that are referred to by the Java program.

The execution engine 130 runs the class files. That is, after the JVM 110 loads class files, the execution engine 130 executes the bytecodes for the methods contained within the class files. Bytecodes can be interpreted as the machine language of the JVM. As such, the execution engine 130 translates the bytecodes from the class files into native machine code that is executable by the computing platform supporting the JVM environment.

Figure 2:
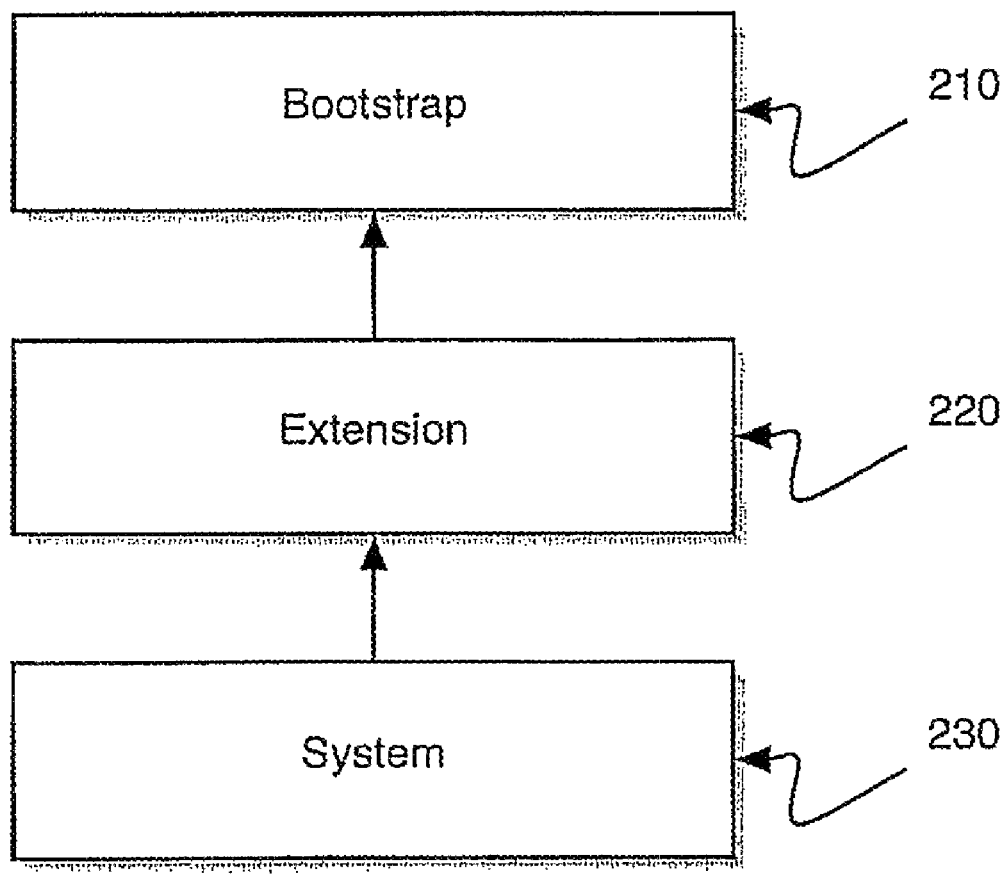
FIG. 2 is a block diagram illustrating a class loading architecture in a Java 2 Standard Edition (J2SE) environment, in accordance with one embodiment of the present invention.

FIG. 2 is a block diagram illustrating the class loading tree, or architecture, 200 in a Java 2 Standard Edition (J2SE) environment, for example, in accordance with one embodiment of the present invention. The J2SE environment includes a bootstrap class loader 210, an extension class loader 220, and a system class loader 230.

The bootstrap class loader 210 is responsible for loading the core Java classes. The bootstrap class loader 210 is unique in that it is not actually a subclass of "java.lang.ClassLoader" but is implemented by the JVM itself. The bootstrap class loader 210 loads classes in some default manner (e.g., from a local disk).

The extension class loader 220 is responsible for loading classes from the jars in the JRE's extension directory (e.g., jre/lib/ext or as specified by the java.ext.dirs system property). This provides a standard mechanism to introduce new functionality beyond the core Java classes introduced by the bootstrap class loader 210.

The system class loader 230 is responsible for loading classes from the directories and jars listed on the command-line and/or the "java.class.path" system property when the JVM is invoked. If not otherwise specified, any user-instantiated class loader will have this loader as its parent.

Resolving errors in the loading of classes in a J2SE environment can be relatively straightforward, as there are well defined classes with a minimum of dependencies that are loaded by the three classloaders of FIG. 2. However, class loading in a Java 2 Enterprise Edition (J2EE) environment can be quite complex since there can be multiple class loaders, thereby increasing recursiveness due to dependencies. The J2EE edition includes a rich set of services built for a server environment. Resolving class loading errors due to the recursive nature of dependencies in a J2EE environment can be time-consuming and complex. In addition, the J2EE specification defines "applications" in a flexible manner that adds important elements to the class-loading picture. Applications are component-based, co-resident but separate, and reloadable, as described below.

Class loading in the J2EE JVM environment is component based. That is, applications are not monolithic, rather they are collections of components (EJBs, Servlets, JSPs, Resource Adapters, etc.) that have predefined packaging (e.g., using JAR, WAR, and RAR files) and deployment directory structures as well as an umbrella packaging structure (e.g., EAR files).

Figure 3:
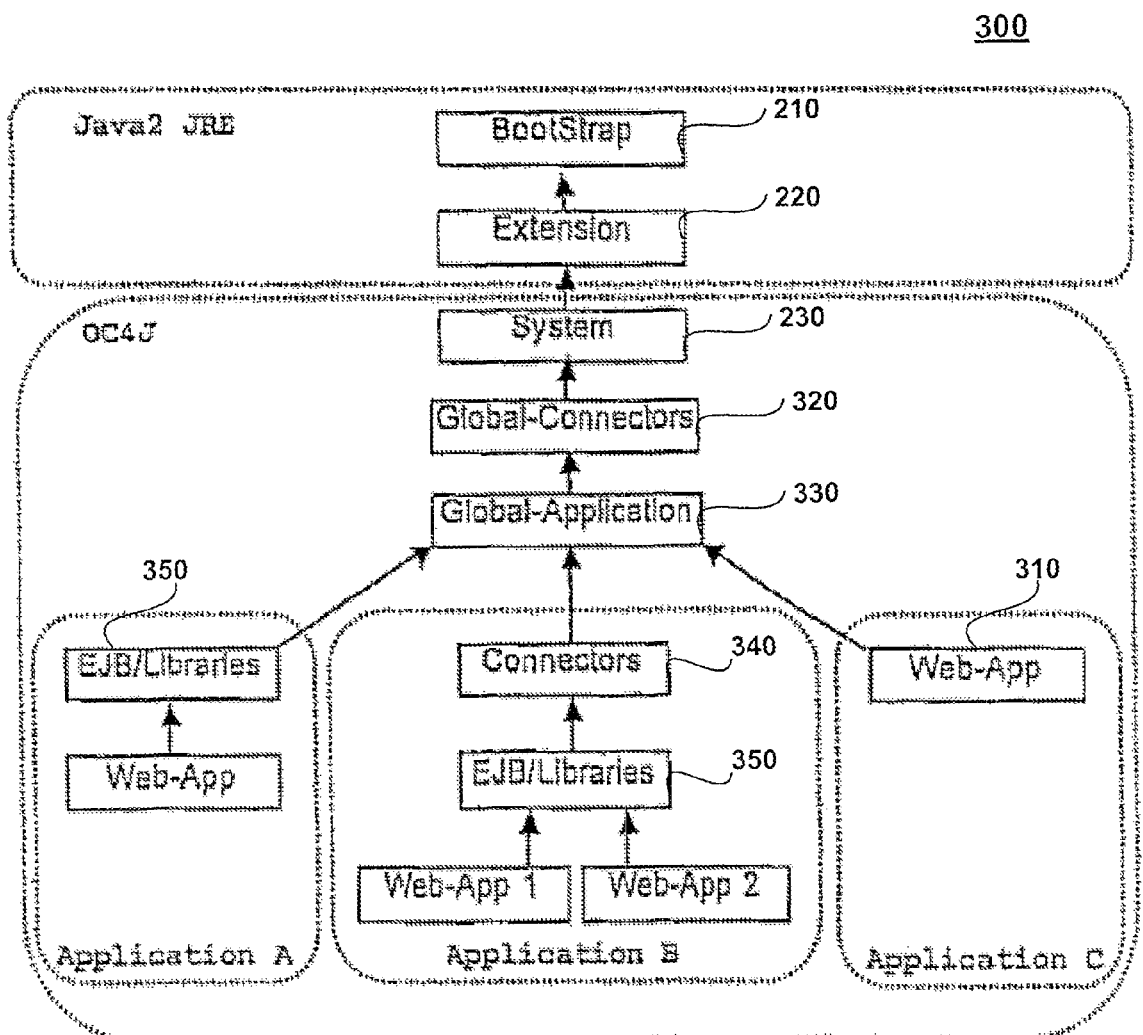
FIG. 3 is a block diagram illustrating an exemplary class loading architecture in a Java 2 Enterprise Edition (J2EE) environment, in accordance with one embodiment of the present invention.

FIG. 3 is a block diagram illustrating an exemplary class loading architecture 300 in a J2EE environment, in accordance with one embodiment of the present invention. As shown in FIG. 3, the class loading architecture of the J2SE environment is included in the bootstrap 210, extension 220, and system 230 class loaders. As such, the J2EE utilizes the default Java Runtime Environment (JRE) supplied system class loader 230 to load and launch class files.

As shown, in FIG. 3, the J2EE class loading architecture 300 can be quite complex, having 3 different applications, as follows: application A, application B, and application C. Application A has a single class loader 310. Applications A and B have multiple class loaders. In J2EE each application has at least one class loader which have different configuration mechanisms that control which code-sources associated with class files end up in the class loader.

Also shown in FIG. 3 is a global connector class loader 330 that contains all code-source from RAR files referenced in a global connector file (e.g., connectors.xml file). The global application loader contains all code-sources from any <library> tags in the global application.xml file. In application B, the "connectors" class loader 340 contains all code-sources from any application RAR files. The "ejb/libraries" class loader 350 contains all code-sources from any <ejb> tags in application.xml, and from any applicable <library> tags. The web application loader contains code-sources from WAR files, any <classpath> tags, and any <library> tags.

The system class loader 230 becomes part of the parent chain for all subsequent class loaders below it. For example, the class loaders created for the applications A, B, and C all have the system loader in their parent chain. As a result, classes bundled at the application level that also exist at the system level will never be loaded from the application using the standard search mechanism. The standard class loader search-order requires consulting the parent loader first, and any hit stops the search.

Policy Class Loaders

Embodiments of the present invention describe a new type of class loader, a policy class loader ("PolicyClassLoader"). This policy class loader is a subclass of the "java.lang.Class-Loader," in accordance with one embodiment. This new type uses composition rather than inheritance to achieve flexibility within a class loading architecture.

Embodiments of the present invention are well suited to supporting automated code-source indexing for class loaders in a JVM environment. Other embodiments are well suited to supporting automated code-source indexing for policy class loaders in a JVM environment. While embodiments of the present invention are described within the context of loading classes, other embodiments of the present invention are well suited to the context of loading resources.

Figure 4:
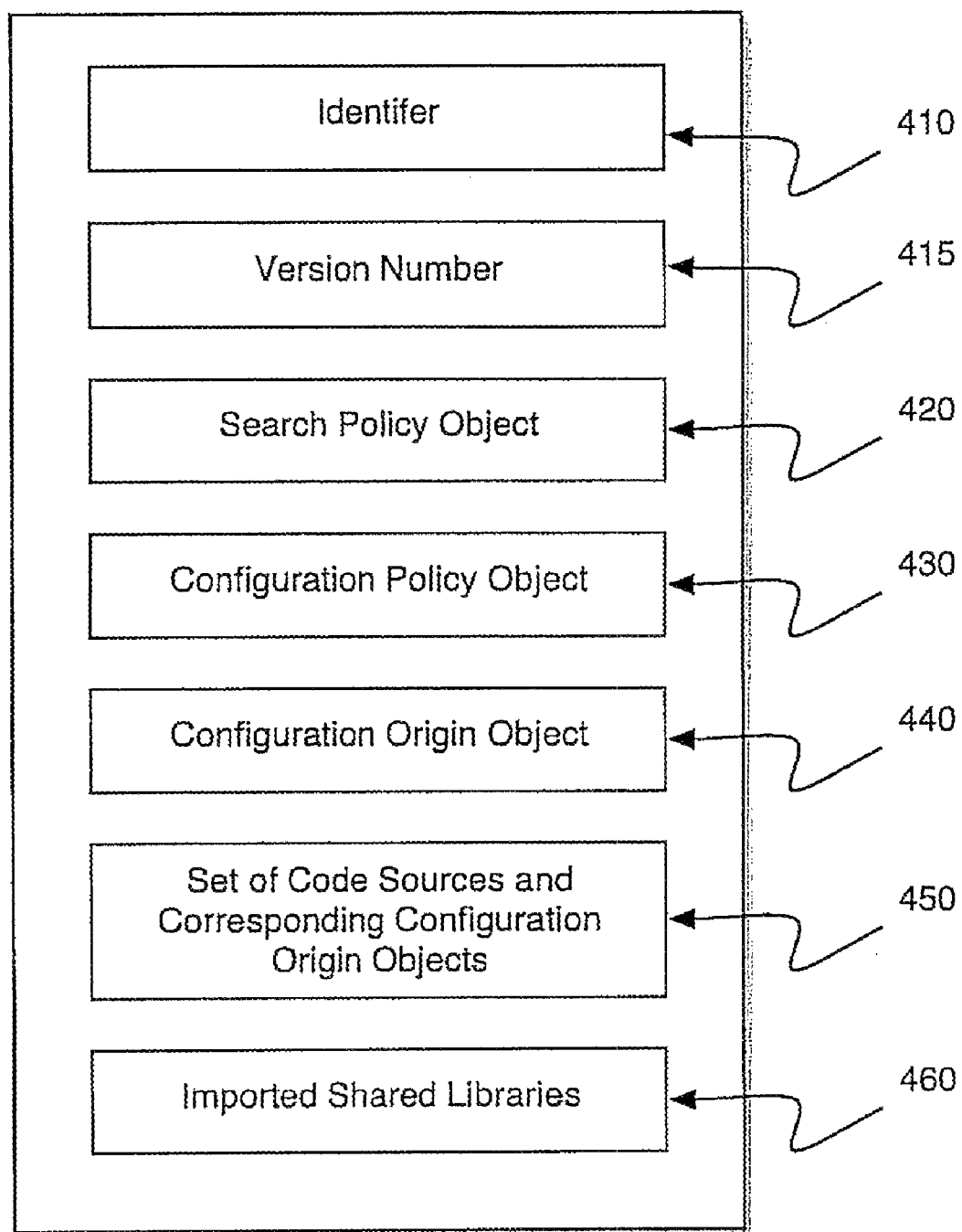
FIG. 4 is a block diagram illustrating a policy class loader that is capable of providing automated root cause analysis for class loading exceptions, in accordance with one embodiment of the present invention.

FIG. 4 is a diagram illustrating a policy class loader 400 that is capable of providing automated indexing of code sources, in accordance with one embodiment of the present invention. The policy class loader 400 is provided for each class loader in a class loader tree of a Java Virtual Machine (JVM) environment. The policy class loader 400 loads classes in the JVM environment and is able to have, or have access to, new state and meta-data which is used to analyze class loading error conditions. As shown in FIG. 4, the policy class loader 400 comprises an identifier, a version number, a search policy object, a configuration policy object a configuration origin object, a set of code-sources each with their own configuration origin object, and imported shared libraries.

The identifier 410 includes a descriptive name (e.g., "xml.xerces"). The version number 415 (e.g., 1.5.0) corresponds to the version of the policy class loader. The version numbers are preconfigured for some class loaders. For other class loaders, the version number is assigned by the runtime. The combination of the descriptive name and the version number (e.g., "xml.xerces" 1.5.0) is unique within a JVM environment.

The search policy object 420 defines search procedures to discover and load a class by the associated policy class loader. For example, the search policy object 420 enables composition of any set of steps required to find and load a class or resource. The instance passed to the constructor will be used by default, but alternate entry points exist that allow the policy to be passed in, thus enabling very flexible search behaviors. There are many pre-defined search policies, but other examples of search policies in addition to the standard search policy that may be defined and used by the search policy object 420 includes the following: 1) generation of source file(s); 2) compilation of source file(s); 3) index consultation for acceleration, etc.

In addition, the search mechanism could also be used to filter class access, which prevents the return of a class, based on some predefined criteria, in one embodiment.

For example, the search policy object may define the search mechanism to be a standard search mechanism, in one embodiment. The standard search mechanism searches up the parent chain to locate the class file. For instance, each class loader instance has an associated parent class loader as well as a cache for previously loaded classes. When called to load a class, the class loader, the initiating class loader, first looks in its cache, and if no class if found, it will delegate to its parent. If the parent cannot return the class, the class loader will attempt to find the class itself in its code-sources. This is a recursive process that goes to the top level in the class loader tree.

In another example, the search policy object may define the search mechanism used for web applications. That is, the class loader first looks locally to load the class. For instance, the class loader first looks for the class in the cache of the JVM. If the class is not found, then the local code-sources are examined to discover the class. If the class is not found locally, then the class is looked for in imported shared class loaders. If the class is still not found, then the class is looked for up the parent chain.

Also shown in FIG. 4 is a configuration policy object 430. The configuration policy manages the configuration of the class loader. This ensures consistent usage and provides additional meta-data for diagnostics. For example, the configuration policy object 430 may define categories for class loaders by the role of the contained classes, as follows: 1) a system class loader that contains internal classes and API classes; 2) a shared class loader for classes shared across loader hierarchies; and 3) an application class loader for application specific classes.

In addition, FIG. 4 illustrates at least one configuration origin object 440. The configuration origin object 440 comprises metadata for describing interrelationships between the policy class loader to other class loaders in the class loader tree. For example, the configuration origin object describes what configuration in the system caused this loader to be created (e.g., an application deployed in a server). That is, the configuration origin object 440 describes a generic type of configuration, such as a specific origin of the configuration origin object (e.g., file name). For instance, the configuration origin object may include the path to the configuration file itself that caused the class loader to be created.

Also, the configuration origin object 440 of a class loader may describe all of the external configuration options that are available to modify the contents within the class loader. For instance, the object 440 may include a list of external configuration options available for modifying contents of the policy class loader.

The policy class loader 400 also includes a set of code-sources 450. Each of the code-sources in the set 450 is loadable by the policy class loader 400. Each code-source in the set of code-sources 450 is also configured with at least one configuration origin object. The configuration origin object comprises metadata for describing interrelationships between the code-source to other classes in the class loader architecture. For example, the configuration origin object may include the path to the configuration file itself that caused the code-sources to be added to the class loader.

For example, code-sources can be labeled with the configuration option used to add it to the class loader, as well as the specific configuration file that was used. Additionally, the configuration origin object 440 specifies whether the code-source manifest "Class-Path" or "Extension-List" attributes should be processed.

Additionally, generally available information used for troubleshooting is discoverable through the policy class loader 400 and provides additional configuration information that describes how a class loader is created. For example, the class loader that forms the root of the class loader tree is available and identified. Also, each class loader can provide a list of all of its children class loaders. In addition, a list of parent class loaders for a particular class loader is discoverable by walking up its parent chain. Further, class loaders are labeled with their role and scope. For instance, roles may be defined as system, application, or shared class loaders.

In addition, the class loader may include information that lists all of the code-sources contained within the class loader or is accessible by the policy class loader.

The policy class loader also includes imported shared libraries 460. The imported shared libraries disclose the concept of a shared class loader, in accordance with one embodiment of the present invention. That is, a shared class loader can be referenced by multiple loaders, but is outside of the normal parent chain.

Figure 5:
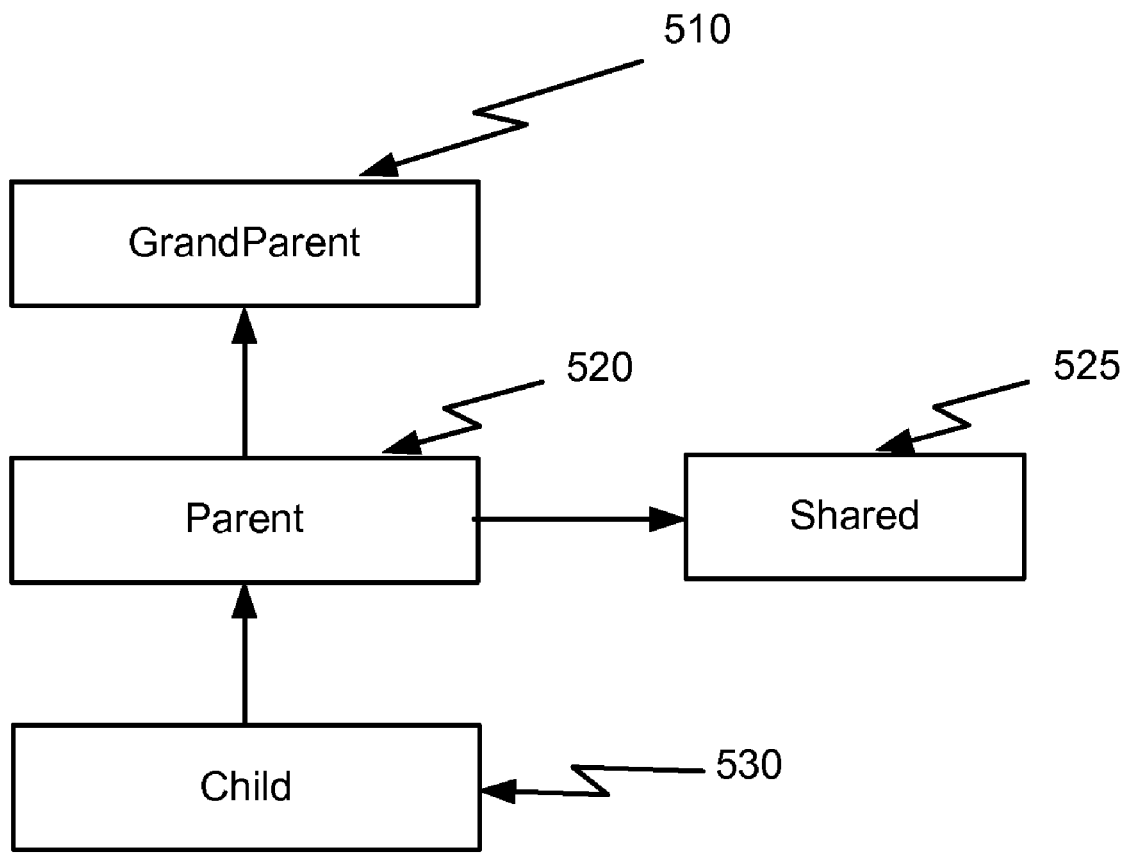
FIG. 5 is a diagram illustrating a class loader tree including shared libraries, in accordance with one embodiment of the present invention.

FIG. 5 is a diagram illustrating a class loader tree 500 including shared libraries, in accordance with one embodiment of the present invention. As shown in the class loader tree 500, a chain of class loaders includes a grandparent class loader 510, which is a parent of the parent class loader 520. In addition, the parent class loader 520 is a parent to the child class loader 530. Also, the parent class loader 520 can access the classes of the imported shared library 525. As such, a search that begins at the child class loader 530 will not see any classes from the imported shared library 525 that is shared by the parent class loader 520. However, if the search begins at the parent class loader 520, then the classes in the imported shared library 525 would be visible.

Also, additional configuration information is discoverable through various query mechanisms. That is, configuration information is accessed or searched through query mechanisms. For example, a list of classes accessible by the list of code-sources is discoverable. Further, given a specific class, all of the classes upon which that class is directly dependent is discoverable.

In another embodiment, the policy class loader further comprises a security policy. The security policy outlines protective measures taken within the class loader tree. Class loaders play a vital role in forming the association between a class instance and it's code-source. As such, the security policy of the class loader can play a vital role in securing the code-sources in the class loader tree.

While the present embodiment includes the previously defined objects for a policy class loader, other embodiments are well suited to additional objects including additional information as prescribed within the policy class loader.

Figure 6:
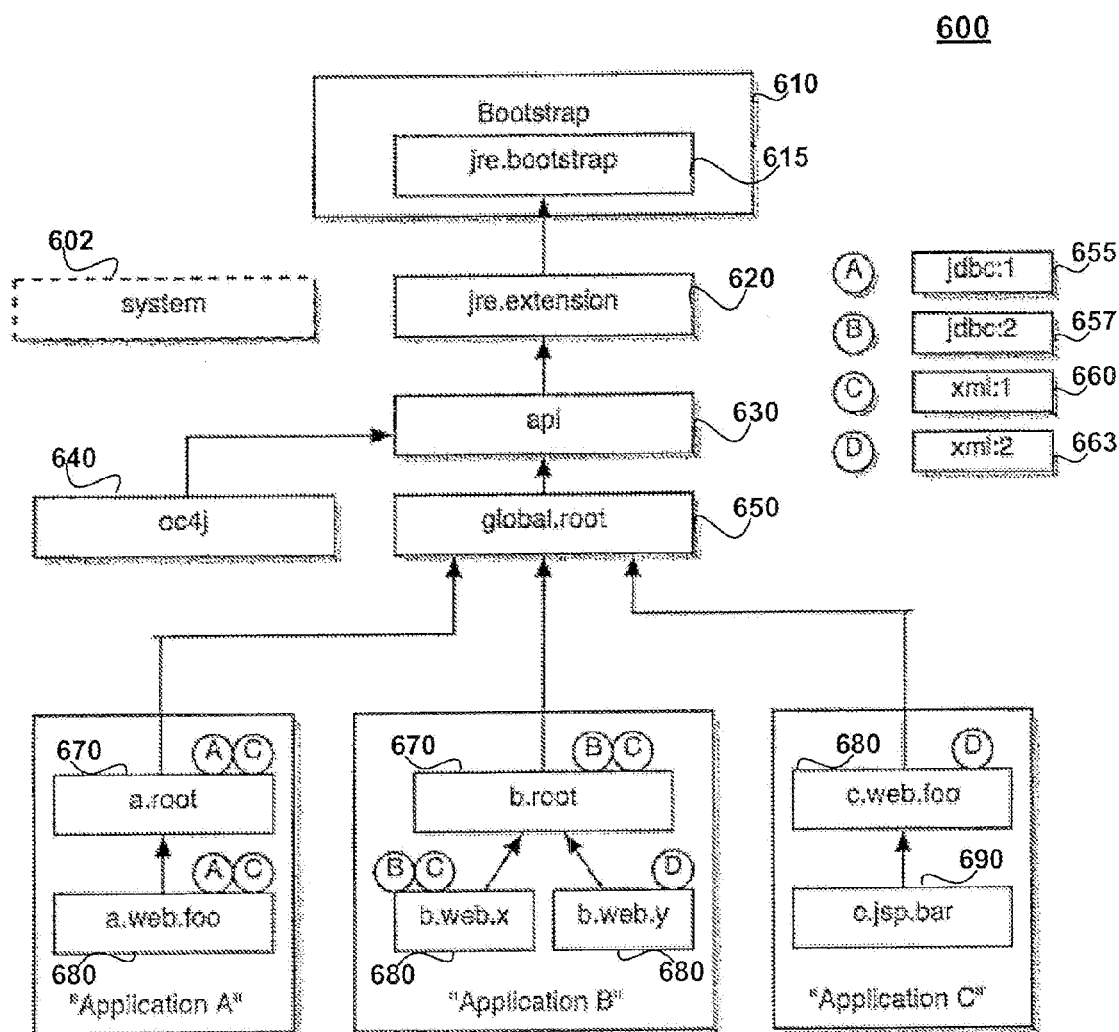
FIG. 6 is a block diagram illustrating a class loading architecture 700 that implements the new policy class loader type, in accordance with one embodiment of the present invention.

FIG. 6 is a block diagram illustrating a class loading tree 600 that implements the new policy class loader type, in accordance with one embodiment of the present invention. As shown in FIG. 6, the standard JRE loaders are replaced with the new policy class loader type. This also provides additional configuration flexibility.

While the bootstrap loader 610 cannot be replaced because it is native, the present embodiment wraps the bootstrap loader 610 with a policy class loader 615 (e.g., the "jre.bootstrap"). The "jre.bootstrap" loader 615 is a proxy for the native bootstrap loader 610 built in to the JVM. The loader 615 delegates calls to and provides diagnostics for the bootstrap loader 610. As such, the policy class loader delegates all the instructions to the bootstrap loader 610. In that way, the bootstrap loader 610 is made to look like a policy class loader through the use of the "jre.bootstrap" loader 615. That is, the bootstrap loader 610 is not directly visible at runtime. As a result, interfacing with the bootstrap loader 610 through the "jre.bootstrap" loader 615 is similar to any policy class loader.

The "jre.extension" loader 620 is a policy class replacement for the JRE supplied "extension" loader. The original extension loader is garbage-collected.

The "api" policy class loader 630 is a replacement for the JRE supplied "system" class loader 602. The system class loader 602 is created by the java virtual machine at startup. The system class loader 602 is the default delegation parent for new user-defined class loaders created by a java application. The system class loader 602 is usually the user-defined class loader that loaded the initial class of the java application, and is the entry point that orchestrates the boot process that creates and populates the system loaders. That is, at startup, the system class loader 602 holds the bootstrap classes of the bootstrap class loader 610. Once the boot process is completed, the system class loader 602 is no longer used.

The api class loader 630 contains J2EE and Java API classes that must be visible to all applications as well to internal classes (e.g., oc4j 640 class loader). The oc4j loader 640 contains all implementation classes that should not be visible to applications.

The "global.root" policy class loader 650 is a consolidation of the "global-connector" and "global-application" loaders. The "jdbc:1" 655 and "jdbc:2" 657 policy class loaders are shared loaders containing different versions of JDBC classes. The "xml:1" 660 and "xml:2" 663 policy class loaders are shared loaders containing different versions of XML parser classes. The "<app name>.root" 670 policy class loader is a consolidation of the "connectors" and "EJB/Libraries" loaders. The "<app-name>.web.<web-mod-name>" 680 policy class loader is a web module. The "<app-name>.jsp.<jsp name>" 690 policy class loader is a JSP class loader.

Automated Indexing of Code-Sources

Figure 7:
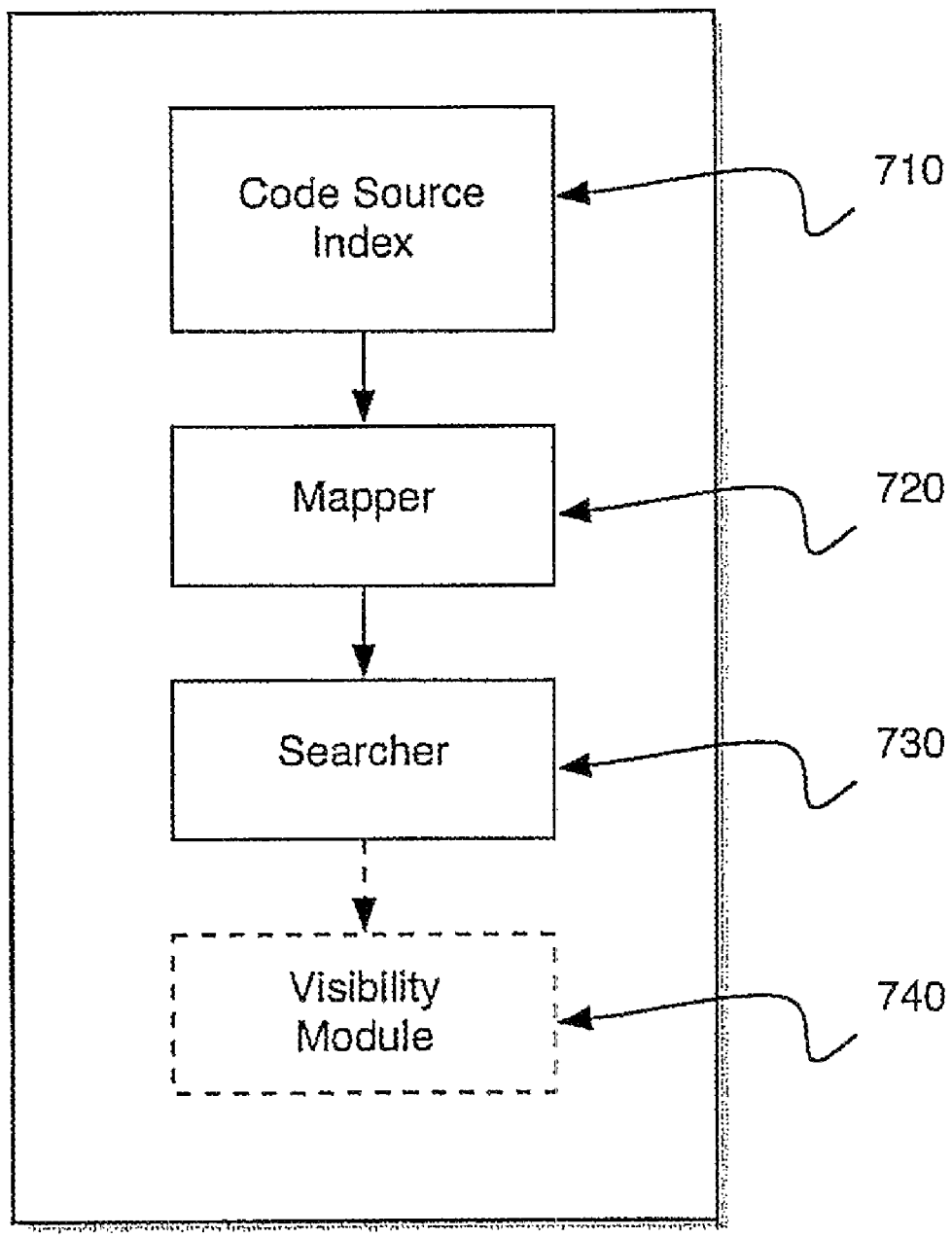
FIG. 7 is a block diagram illustrating a system for class loading including a code-source index, in accordance with one embodiment of the present invention.

FIG. 7 is a block diagram of a system 700 for class loading in a JVM environment that utilizes a code-source index, in accordance with one embodiment of the present invention. The present embodiment enables the automatic creation and maintenance of class indices for J2EE applications, for example, in a class loader master index. The system 700 includes a code-source index 710, a mapper 720, and a searcher 730. Optionally, a visibility module 740 is also included in the system 700.

As shown in FIG. 7, the code-source index 710 relates packages in at least one policy class loader of a class loader tree to associated code-sources containing those packages. The code-source index 710 comprises a plurality of parameters for cross-referencing the packages to code-sources. In one embodiment, the code-source index 710 cross-references packages to code-sources on a localized basis for a single policy class loader, as will be further described in relation to FIG. 8A. In another embodiment, the code-source index 710 cross-references packages to code-sources on a globalized basis for a plurality of policy class loaders in a policy class loader tree of a JVM environment, as will be further described in relation to FIG. 8B.

The mapper 720 in the system 700 accesses the code-source index for mapping a package to one or more code-sources. More specifically, the mapper 720 maps a package associated with a class (e.g., a class that is being invoked in a class loading event) to one or more associated code-sources. These code-sources potentially can access the class that is being invoked.

For example, a fully qualified class name is composed of a package name and a class name. As such, the fully qualified class name provides a path to search for within a code-source that is able to access the class, assuming there are no errors. The class name is formatted into two parts, as follows: 1) package; and 2) class. For instance, a class name of "com.companyA.Foo" in the first part represents the package, "com.companyA," and in the second part the class, "Foo". As such, the class name can be further represented as a path to the package "com.companyA" and the class name, "Foo," as follows: "com/companyA/Foo.class," where the ".class" clarifies that the path is to a class.

In class loading, a significant amount of time is devoted to locating the specific code-source in a class loader, for example. That is, each of the code-sources associated with a specific class loader would be queried in order as specified by a list of code-sources whether it is able to access that specific class. On the other hand, the code-source index 710 can be used to quickly extract code-sources for a particular package for one or more policy class loaders.

Given a package name, the mapper 720 accesses the code-source index to determine the set of code-sources that might contain the class loader that is able to access the class. In addition, the mapper 720 is also able to determine when no code-source is able to access the class. That is, when the mapper 720 returns a null set for the set of code-sources that might contain the class loader when no code-source is able to access the class. In this case, an exception can be thrown indicating that there is a class loading failure.

Once a set of code-sources is obtained that is associated with the package name, the searcher 730 determines at least one code-source, package, policy class loader combination that is capable of accessing the class, in accordance with one embodiment of the present invention. That is, not all of the code-sources are able to access the class. As such, the searcher 730 is able to query each of the code-sources to determine if any are able to access the class.

Also, more than one code-source may potentially access the class. For example, the set of code-sources associated with the package name may be associated with one or more policy class loaders. These policy class loaders are called "defining" class loaders as they load the associated class. As such, the searcher 730 determines which code-sources associated with which policy class loader in the set of code-sources obtained by the mapper 720 is capable of accessing the class.

If the code-source index provides cross-referencing for a single policy class loader, the searcher 730 determines which code-source in the policy class loader is capable of accessing the class. If the code-source index provides cross-referencing for a plurality of policy class loaders, the searcher 730 determines which code-sources and their associated policy class loaders are capable of accessing the class.

For the case where there are one or more code-sources associated with one or more class-loaders, a visibility module 740 can determine whether a selected package, code-source, and policy class loader combination is visible. That is, the visibility module 740 determines whether the policy class loader in the combination is visible within a class loader search sequence including the initiating policy class loader that invokes a class loading event for that class. As such, the visibility module 740 determines if the selected policy class loader is visible to the initiating policy class loader. If the selected policy class loader is not visible to the initiating policy class loader, then a class loading failure would occur.

Figure 8A:
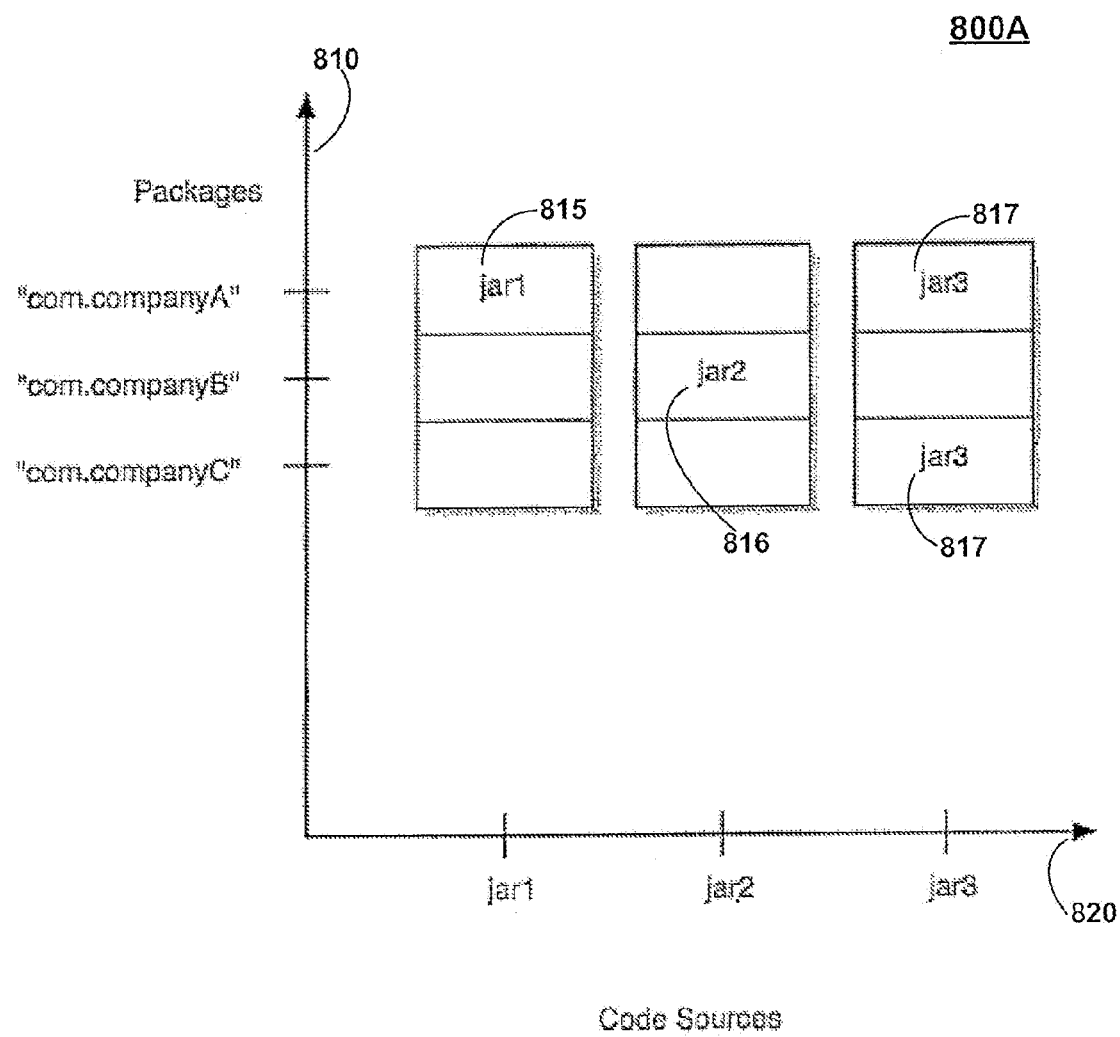
FIG. 8A is a diagram of an exemplary code-source index of two dimensions that is localized to a single policy class loader, in accordance with one embodiment of the present invention.

FIG. 8A is a diagram illustrating an exemplary code-source index of two dimensions that is localized to a single policy class loader, in accordance with one embodiment of the present invention. The represented policy class loader has been described previously with respect to FIGS. 1 through 6. In the present embodiment, the code-source index cross-references code-sources to packages in a single policy class loader. That is, given a package name, a list or set of code-sources that contain classes in that package can be determined. As such, each policy class loader in a class loader tree would be associated with a separate code-source index.

In FIG. 8A, the code-source index 800A is illustrated with two dimensions, as represented as parameters, for example. Axis 810 represents packages that are associated with the represented policy class loader. As such, the first parameter includes a plurality of packages. For instance, code-source index 800A has three packages "com.companyA", "com.companyB", and "com.companyC". The code-source index 800A can include more packages or less packages.

The packages are associated with a plurality of classes that is capable of being loaded by the represented policy class loader. That is, each of the plurality of packages comprises at least one code-source for accessing the plurality of classes.

Axis 820 represents code-sources that are associated with the plurality of packages. As such, the second parameter includes a plurality of code-sources. Code-sources "jar1" 815, "jar2" 816, and "jar3" 817 are shown in FIG. 8A; however, the code-source index 800A may include more code-sources, or less code-sources. Each of the plurality of code-sources is associated with at least one of the plurality of packages. That is, each code-source contains one or more packages. For instance, code-source jar3 contains both packages "com.companyA" and "com.companyC". Additionally, more than one code-source is associated with, or can contain, the same package. For instance, both code-sources "jar1" and "jar3" contain package "com.companyA".

As an example, in FIG. 8A, the code-source "jar1" 815 is able to access the class file "Foo". The fully qualified class file name is "com.companyA.Foo" that is associated with a package, "com.companyA". As such, the code-source index 800A provides a quick means for cross-referencing packages to code-sources that potentially could load the class file "Foo". As a result, the code-source index 800A would verify that the represented code source can access the package "com.companyA" through the code-sources "jar1" 815 and "jar3" 817. Thereafter, the present embodiment is able to determine that the code-source "jar1" 815 is able to access the class file "Foo".

While the code-source index 800A of the present embodiment is described within the context of a look-up table, other embodiments are well-suited to alternative means for cross-referencing code-sources to packages in a single policy class loader. For example, the code-source index may be comprised of lists of code-sources for each package, or other means for cross-referencing code-sources to packages, as represented by the first and second parameters, respectively.

Figure 8B:
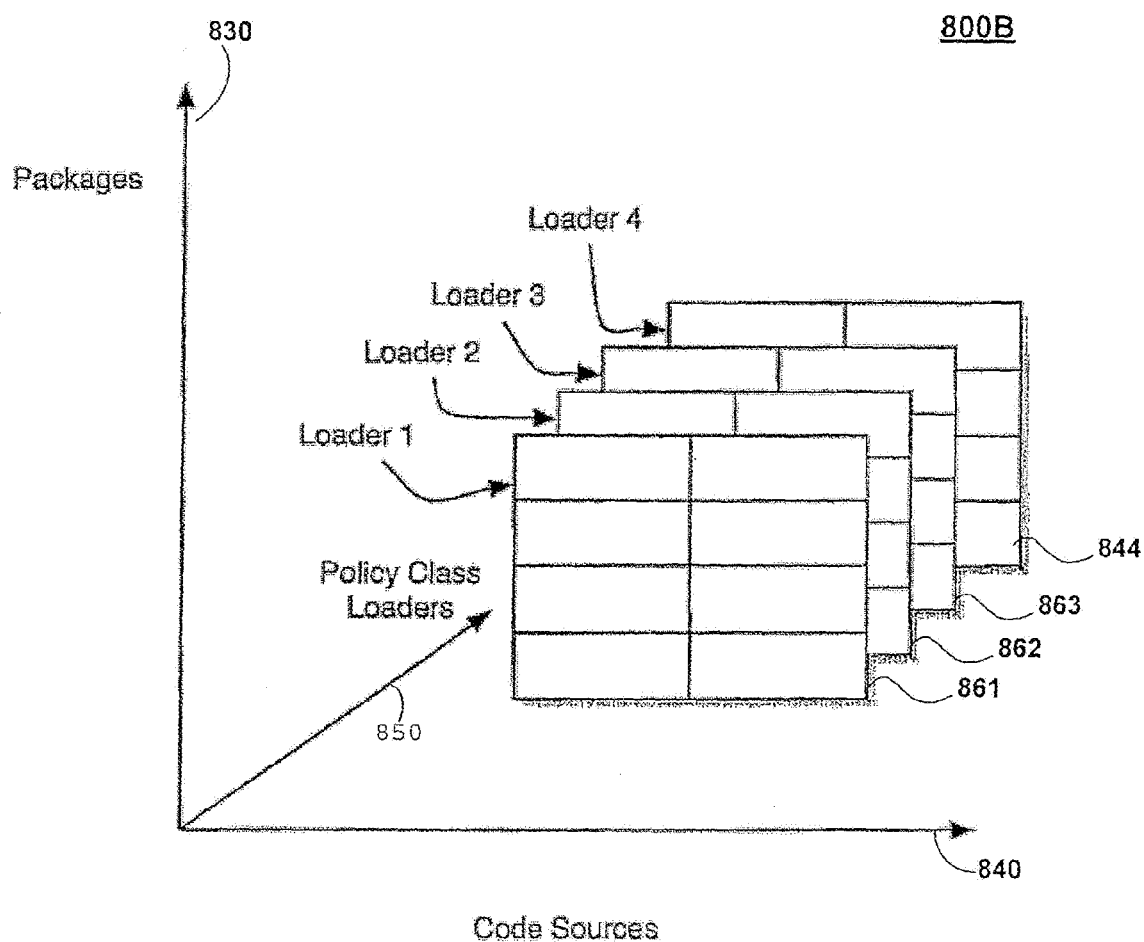
FIG. 8B is a diagram of an exemplary code-source index of three dimensions that is globalized to a plurality of policy class loaders in a policy class loader tree, in accordance with one embodiment of the present invention.

FIG. 8B is a diagram illustrating an exemplary code-source index of three dimensions that is globalized to a plurality of policy class loaders in a class loading architecture, in accordance with one embodiment of the present invention. In the present embodiment, the code-source index cross-references packages to code-sources in a plurality of policy class loaders. That is, given a class name, a policy class loader/code-source/package name set can be determined. As such, each of the policy class loaders in a class loader tree would be associated with a single code-source index.

In FIG. 8B, the code-source index 800A of FIG. 8A is illustrated with three dimensions, as represented as parameters, for example. Axis 850 represents policy class loaders found within the class loader tree of an associated JVM environment. As such, the first parameter includes at least one policy class loader in the JVM class loader tree.

Axis 830 represents packages that are found within policy class loaders in the class loader tree. As such, the second parameter includes a plurality of packages. The packages are associated with a plurality of classes that is capable of being loaded by a policy class loader in the class loading architecture. That is, each of the plurality of packages comprises at least one code-source for accessing the plurality of classes.

Axis 840 represents code-sources that are associated with the plurality of packages. As such, the third parameter includes a plurality of code-sources. Each of the plurality of code-sources is contained within one of the plurality of packages. The plurality of packages are associated with a plurality of classes that are capable of being loaded by the plurality of policy class loaders. As such, the plurality of packages comprises at least one code-source for accessing the plurality of classes.

As shown in FIG. 8B, in one embodiment, each code-source index 800A associated with every policy class loader can be incorporated together to form the code-source index 800B, in one embodiment. For example, four separate code-source index 861 representing class loader 1, code-source index 862 representing class loader 2, code-source index 863 representing class loader 3, and code-source index 864 representing class loader 4 can be combined into a single code-source index 800B.

As such, the code-source index 800B provides a quick means for cross-referencing packages to code-sources and policy class loaders in a policy class loader tree of a JVM environment. That is, through the code-source index 800B, it can be determined which policy class loaders potentially can access the class. That is, given a class name, the code-source index 800B provides all the code-source, package, policy class loader combinations that are capable of accessing the class.

While the code-source index 800B of the present embodiment is described within the context of a look-up table, other embodiments are well-suited to alternative means for cross-referencing code-sources to packages in a single policy class loader. For example, the code-source index may be comprised of list, or other means for cross-referencing policy class loaders to packages to code-sources, as represented by the first, second and third parameters.

As a result, the code-source indexes of FIGS. 8A and 8B provide for central management of all code-sources in a JVM environment. Central management is possible regardless of the policy class loader. That is, the code-source index utilizes an abstraction that supports class and resource name extraction for any type of code-source, package, and policy class loader combination.

The code-source indexes of FIGS. 8A and 8B are built dynamically and automatically at run-time, in accordance with one embodiment of the present invention. That is, in the present implementation, each policy class loader goes through a construction stage. Code-sources can only be added to a policy class loader during the construction stage. After all the code-sources have been added, the policy class loader is committed. That is, no more code-sources can be added to the policy class loader after the commitment.

At this point, all the code-sources are known for the policy class loader. As such, the code-source index can be built automatically by walking through each of the code-sources and discovering which packages are associated with the code-sources.

In another embodiment, the code-source data may change for a policy class loader after commitment. In this case, the code-source index can be updated to reflect the change. As such, maintenance of the code-source index is possible.

In still another embodiment, the code-source index is persistent. That is, the code-source index persists even though the computing system running an associated JVM environment may have crashed. As such, when rebooting the system, the code-source index that persists may be re-used without rebuilding the code-source index. In this case, the code-source index can be automatically checked to verify that the underlying code-source data has not changed. For example, a validator (not shown) can validate that the code-source index that has persisted is still valid by checking the underlying code-source data. If the underlying data has not changed, then the code-source index that has persisted can be reused. However, if the underlying code-source data has changed, then the code-source index needs updating, or rebuilding.

Figure 9:
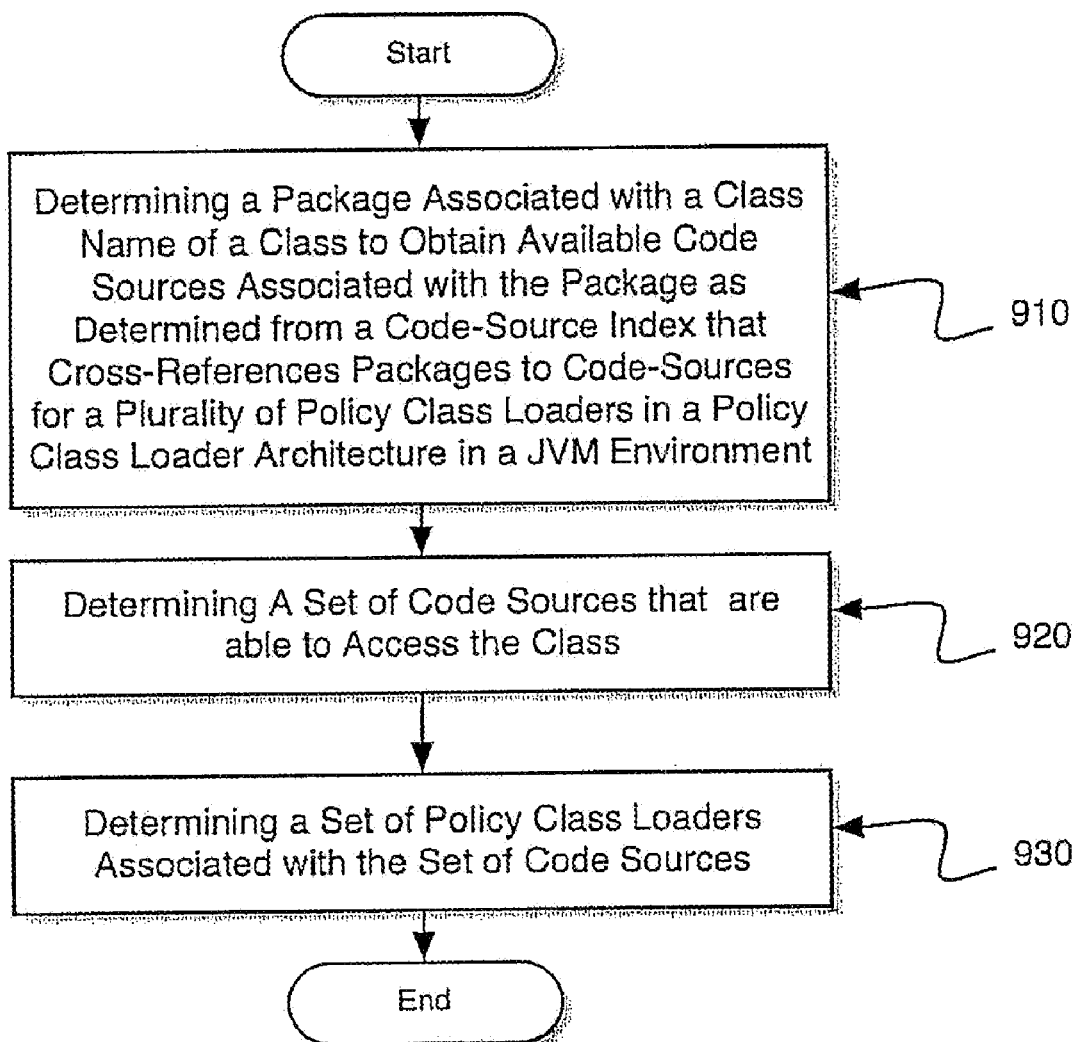
FIG. 9 is a flow diagram illustrating steps in a computer implemented method for locating a class in a policy class loader tree of a JVM environment, in accordance with one embodiment of the present invention.

FIG. 9 is a flow diagram illustrating steps in a computer implemented method for locating a class in a J2EE JVM environment using a code-source index, in accordance with one embodiment of the present invention. The present embodiment is implemented within a class loader tree that utilizes policy class loaders.

At 910, the present embodiment determines a package that is associated with a class name of the class. That is, given a class name, the package associated with the class name can be determined. Typically, as described previously, a class name that is invoked provides a path within a code-source that is able to access the class. The class name is formatted into two parts, as follows: 1) package; and 2) class. As such, the package can be quickly determined from the class name. For instance, in the previously presented example, for class name, "com.companyA.Foo," the package is "com.companyA."

Given the package, the present embodiment is able to determine available code-sources that are associated with the package in the JVM environment. As such, it is possible that at least one code-source from the available code-sources that are associated with the package is able to access the class. The code-sources are determined from a code-source index that relates packages to code-sources for a plurality of policy class loaders in a policy class loader tree in the JVM environment.

At 920, the present embodiment determines a set of code-sources from the available code-sources that might contain the class. That is, not all of the code-sources can contain the class. Also, the present embodiment can determine whether none of the code-sources can access the class. In that case, the set of code-sources is a null set.

At 930, the present embodiment determines a set of policy class loaders associated with the set of code-sources. In this way, the code-source index can be used to locate a policy class loader in a JVM environment that can load the class. Moreover, another embodiment is capable of determining whether a code-source is visible to any given policy class loader in the policy class loader tree.

Figure 10:
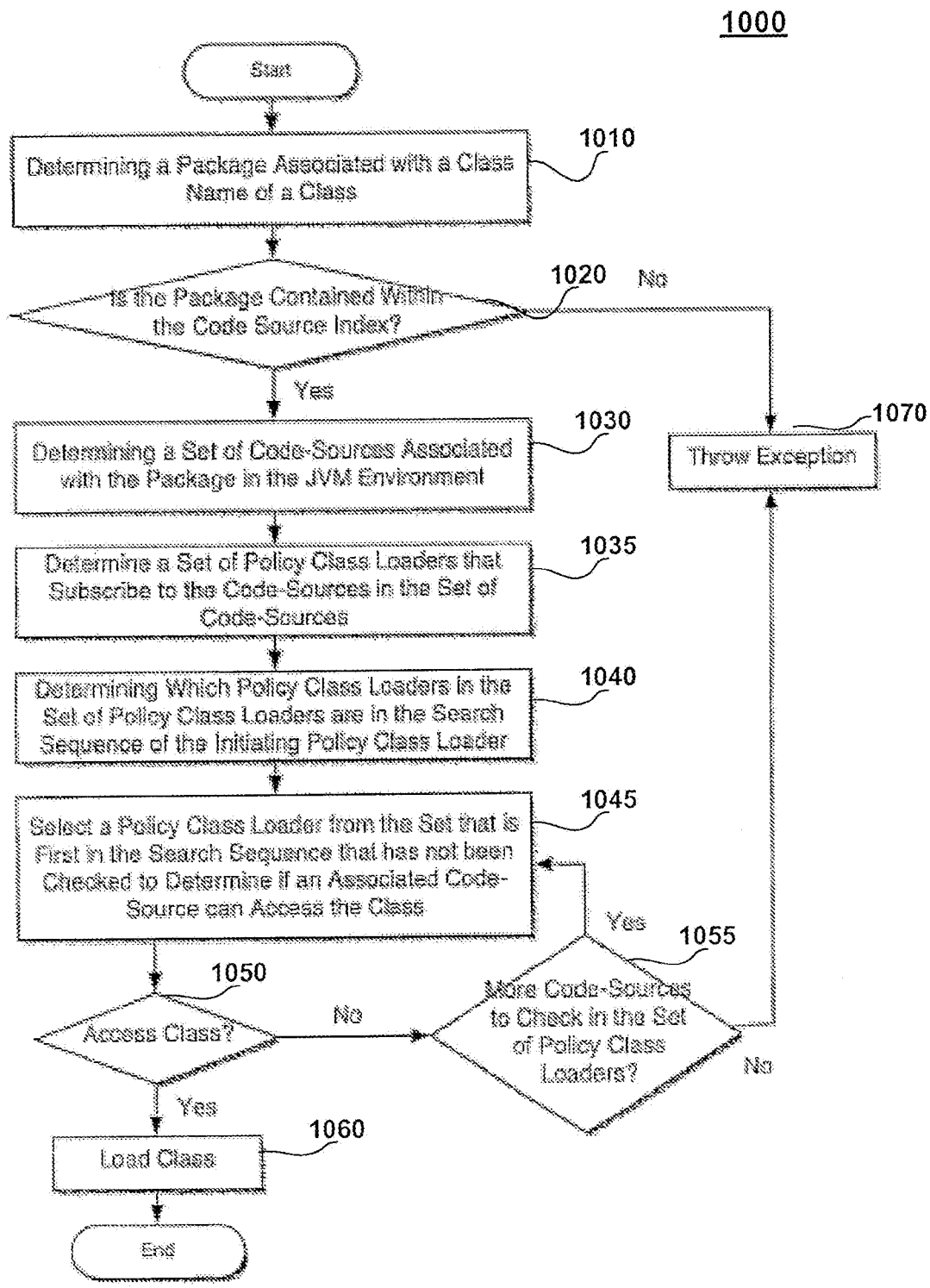
FIG. 10 is a flow diagram illustrating steps in a computer implemented method for loading a class in a JVM environment, in accordance with one embodiment of the present invention.

FIG. 10 is a flow diagram illustrating steps in a computer implemented method for loading a class utilizing the code-source index, in accordance with one embodiment of the present invention. The present embodiment is implemented within a class loader tree that utilizes policy class loaders. For example, the search mechanism employed for loading the class in FIG. 10 may be implemented within a search policy of an initiating policy class loader that invokes a class loading event for the class in a search sequence that includes the initiating policy class loader.

The embodiment of FIG. 10 significantly reduces the time spent locating classes to load through the use of the code-source index. For example, the present embodiment eliminates the consultation of ancestor class loaders that cannot satisfy the search. In addition, the present embodiment eliminates the consultation of all code-sources that cannot satisfy the search.

At 1010, the present embodiment determines a package that is associated with a class name of the class. That is, given a class name, the package associated with the class name can be determined. The process in 1010 is similar to the process in 910.

At decision step 1020, the present embodiment consults the code-source index to determine if the package is contained within the code-source index. If the package is not contained within the code-source index, then the present embodiment proceeds to 1070 and throws a class loading exception. As such, if no packages are found, the present embodiment is able to determine immediately that correspondingly no code-sources can be found to access the class.

On the other hand, if the package is contained within the code-source index, the present embodiment proceeds to 1030, where the set of code-sources associated with the package is determined. The present embodiment accesses the code-source index to determine the set of code-sources.

At 1035, the present embodiment determines a set of policy class loaders that are associated with the code-sources in the set of code-sources. That is, each policy class loader in the set of policy class loaders can access an associated code-source in the set of code-sources. This is accomplished through a subscription mechanism that cross-references policy class loaders that are subscribing (e.g., using the code-source) to a particular code-source at a particular time. In this manner, a set of policy class loaders associated with set of code-sources is determined.

At 1040, the present embodiment determines which policy class loaders are located in the search sequence of the initiating policy class loader. The search sequence includes the parent chain of class loaders and a shared library of class loaders. The initiating policy class loader invokes a class loading event for the class in the search sequence.

At 1045, the present embodiment selects a policy class loader to determine if its associated code-source can access the class. As such, the present embodiment selects the policy class loader in the set of policy class loaders that is first in the search sequence. Also, the selected policy class loader has not already been checked to determine if its associated code-source can access the class.

At decision step 1050, the present embodiment determines if the selected policy class loader and its associated code-source can access the class. If the class can be accessed by the selected policy class loader, the present embodiment proceeds to 1060 and loads the class.

On the other hand, if the selected policy class loader cannot access the class, the present embodiment proceeds to decision step 1055 to determine whether there are more code-sources to check in the set of policy class loaders. If there are no more code-sources to check, the present embodiment proceeds to 1070 and throws a class loading exception.

However, if there are more code-sources to check, then the present embodiment proceeds back to 1045 to select the next policy class loader in the search sequence. The process is repeated until the class is loaded or an exception is thrown.

Accordingly, various embodiments of the present invention disclose a method and system for automated code-source indexing in a JVM environment that can be implemented for class loading. In particular, embodiments of the present invention provide for a centralized management of code-source in a JVM environment, regardless of the class loader. Also, use of the code-source index significantly reduces the time spent in locating classes to load by eliminating the consultation of ancestor class loaders and code-sources that cannot possibly load the class.

While the methods of embodiments illustrated in flow charts 900 and 1000 show specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

Embodiments of the present invention, a method and system for automated code-source indexing in a JVM environment that can be implemented for class loading are described. While the invention is described in conjunction with the preferred embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

What is claimed is:

1. A method for locating a class in a J2EE java virtual machine (JVM) environment, comprising:
   determining with a computer system executing the JVM environment a package associated with a class name of said class;
   obtaining available code-sources associated with said package from a code-source index that relates code-sources to packages for a plurality of class loaders in a class loader tree in said JVM environment, wherein said code-source index comprises at least a first parameter referencing a plurality of class loaders associated with a class loader tree, a second parameter referencing a plurality of packages associated with a plurality of classes that are capable of being loaded by said plurality of class loaders, and a third parameter referencing a plurality of code-sources, and a mapper for mapping a package associated with a class to one or more associated code sources that potentially can access said class in said plurality of class loaders;
   determining with the computer system a set of code-sources from said available code-sources that are able to access said class; and
   determining with the computer system a set of class loaders associated with said subset of code-sources and based on the class loader tree.

2. The method of claim 1, wherein said set of code-sources is a null set.

3. The method of claim 1,
   wherein each of said plurality of packages referenced by the second parameter comprises at least one code-source for accessing said plurality of classes and
   wherein each of said plurality of code-sources referenced by the third parameter is contained within one of said plurality of packages.

4. The method of claim 1, further comprising:
   detecting with the computer system a change in said class loader tree; and
   modifying with the computer system said code-source index to reflect said change.

5. The method of claim 4, further comprising:
   persisting said code-source index with the computer system to deter re-computing said code-source index; and
   validating said code-source index with the computer system before using a code-source index that has been persisted.

6. The method of claim 4, further comprising:
   determining with the computer system if a code-source is visible to any given class loader in said class loader tree.

7. The method of claim 4, further comprising:
   automatically creating with the computer system said code-source index at build time.

8. A computer system comprising:
   a processor;
   a bus coupled to said processor; and
   a computer readable medium coupled to said bus containing program instructions that when implemented cause said processor to implement a method for locating a class in a J2EE java virtual machine (JVM) environment, comprising:
     determining a package associated with a class name of said class;
     determining a set of code-sources associated with said package in said JVM environment from a code-source index that relates code-sources to packages for a plurality of class loaders in a class loader tree in said JVM environment, wherein said code-source index comprises at least a first parameter referencing a plurality of class loaders associated with a class loader tree, a second parameter referencing a plurality of packages associated with a plurality of classes that are capable of being loaded by said plurality of class loaders, and a third parameter referencing a plurality of code-sources, and a mapper for mapping a package associated with a class to one or more associated code sources that potentially can access said class in said plurality of class loaders;
     determining a subset of code-sources in said set of code-sources that are able to access said class; and
     determining a set of class loaders associated with said subset of code-sources and based on the class loader tree.

9. The computer system of claim 8, wherein said subset of code-sources is a null set.

10. The computer system of claim 8,
    wherein each of said plurality of packages referenced by the second parameter comprises at least one code-source for accessing said plurality of classes; and
    wherein each of said plurality of code-sources referenced by the third parameter is contained within one of said plurality of packages.

11. The computer system of claim 8, wherein said method further comprises:
    detecting a change in said class loader tree; and
    modifying said code-source index to reflect said change.

12. The computer system of claim 8, wherein said method further comprises:
  persisting said code-source index to deter re-computing said code-source index; and
  validating said code-source index before using a code-source index that has been persisted.

13. The computer system of claim 8, wherein said method further comprises:
  determining if a class loader associated with a code-source able to access said class is visible to an initiating class loader that invokes a class loading event for said class in a search sequence of said initiating class loader.

14. The computer system of claim 8, wherein said method further comprises:
  automatically creating said code-source index at build time.

15. A computer readable memory containing program instructions that implement a method for locating a class in a J2EE java virtual machine (JVM) environment, comprising:
  determining a package associated with a class name of said class;
  determining a set of code-sources associated with said package in said JVM environment from a code-source index that relates packages to code-sources for a plurality of class loaders in a class loader tree in said JVM environment, wherein said code-source index comprises at least a first parameter referencing a plurality of class loaders associated with a class loader tree, a second parameter referencing a plurality of packages associated with a plurality of classes that are capable of being loaded by said plurality of class loaders, and a third parameter referencing a plurality of code-sources, and a mapper for mapping a package associated with a class to one or more associated code sources that potentially can access said class in said plurality of class loaders;
  determining a subset of code-sources in said set of code-sources that are able to access said class; and
  determining a set of class loaders associated with said subset of code-sources and based on the class loader tree.

16. The computer readable memory of claim 15, wherein said subset of code-sources is a null set.

17. The computer readable memory of claim 15,
  wherein each of said plurality of packages referenced by the second parameter comprises at least one code-source for accessing said plurality of classes and
  wherein each of said plurality of code-sources referenced by the third parameter is contained within one of said plurality of packages.

18. The computer readable memory of claim 17, wherein said program instructions further comprises:
  detecting a change in said class loader tree; and modifying said code-source index to reflect said change.

19. The computer readable memory of claim 17, wherein said method program instructions further comprises:
  persisting said code-source index to deter re-computing said code-source index; and
  validating said code-source index before using a code-source index that has been persisted.

20. The computer readable memory of claim 17, wherein said program instructions further comprises:
  determining if a class loader associated with a code-source able to access said class is visible to an initiating class loader that invokes a class loading event for said class in a search sequence of said initiating class loader.

\* \* \* \* \*

UNITED STATES PATENT AND TRADEMARK OFFICE
CERTIFICATE OF CORRECTION

PATENT NO. : 8,332,835 B2  
APPLICATION NO. : 12/824523  
DATED : December 11, 2012  
INVENTOR(S) : Atsatt Page 1 of 1

It is certified that error appears in the above-identified patent and that said Letters Patent is hereby corrected as shown below:

Title Page 2, Item (56), in column 1, under "Other Publications", line 14, delete "Supprt" and insert -- Support --, therefor.

In column 1, line 52-53, delete ""java.lang.String")" and insert -- ("java.lang.String") --, therefor.

In column 1, line 54, delete ""resource"." and insert -- "resource"). --, therefor.

In column 5, line 58, delete "shown," and insert -- shown --, therefor.

In column 16, line 60, in Claim 10, delete "classes;" and insert -- classes --, therefor.

Signed and Sealed this  
Twelfth Day of March, 2013

Teresa Stanek Rea  
*Acting Director of the United States Patent and Trademark Office*